United States Patent
Jiang et al.

(10) Patent No.: US 12,166,937 B2
(45) Date of Patent: Dec. 10, 2024

(54) CONTACT IMAGE SENSOR

(71) Applicant: WEIHAI HUALING OPTO-ELECTRONICS CO., LTD., Weihai (CN)

(72) Inventors: Li Jiang, Weihai (CN); Xiaowei Han, Weihai (CN); Yonghui Lin, Weihai (CN); Pengfei Dai, Weihai (CN)

(73) Assignee: WEIHAI HUALING OPTO-ELECTRONICS CO., LTD., Weihai (CN)

( * ) Notice: Subject to any disclaimer, the term of this patent is extended or adjusted under 35 U.S.C. 154(b) by 0 days.

(21) Appl. No.: 17/914,003

(22) PCT Filed: Jul. 27, 2021

(86) PCT No.: PCT/CN2021/108711
§ 371 (c)(1),
(2) Date: Sep. 23, 2022

(87) PCT Pub. No.: WO2022/057448
PCT Pub. Date: Mar. 24, 2022

(65) Prior Publication Data
US 2023/0353692 A1 Nov. 2, 2023

(30) Foreign Application Priority Data

Sep. 15, 2020 (CN) .......................... 202010966228.1

(51) Int. Cl.
*H04N 1/031* (2006.01)
*H04N 1/00* (2006.01)
*H04N 1/028* (2006.01)

(52) U.S. Cl.
CPC ......... *H04N 1/031* (2013.01); *H04N 1/02815* (2013.01); *H04N 1/0318* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 4,553,172 A | * | 11/1985 | Yamada | H04N 1/46 358/2.1 |
| 5,276,530 A | * | 1/1994 | Siegel | H04N 1/401 358/452 |

(Continued)

FOREIGN PATENT DOCUMENTS

| | | | | |
|---|---|---|---|---|
| CN | 1700724 | * | 11/2005 | ............... H04N 1/04 |
| CN | 107743182 A | | 2/2018 | |

(Continued)

OTHER PUBLICATIONS

The World Intellectual Property Organization (WIPO) International Search Report for PCT/CN2021/108711 Oct. 18, 2021 5 pages (with translation).

*Primary Examiner* — Beniyam Menberu
(74) *Attorney, Agent, or Firm* — ANOVA LAW GROUP, PLLC (57) ABSTRACT

A contact image sensor includes a preset scanning plane used for the surface to be scanned to map to the original copy. The contact image sensor includes: a timing circuit: for self-generating light source control signal LRDT and line scan control signal TRIG1; a lens: for collecting reflected light emitted by a light source reflected by the original copy and emitting the reflected light onto a photoelectric conversion chip for converting received optical signals into electrical signals; and a data processing unit: emitting trigger pulse TRIG according to the encoder transmitting the object to be detected, receiving and processing electrical signals output by the photoelectric conversion chip that has the (Continued)

same size of the photoelectric signal output, ensuring the output stability, dynamic range and sensitivity of the image sensor.

7 Claims, 4 Drawing Sheets

(56) References Cited

U.S. PATENT DOCUMENTS

| | | | | |
|---|---|---|---|---|
| 5,402,252 A | * | 3/1995 | Kojima | H04N 1/32358 |
| | | | | 358/474 |
| 2005/0248667 A1 | | 11/2005 | Schweng et al. | |
| 2007/0195379 A1 | * | 8/2007 | Suga | H04N 1/484 |
| | | | | 358/497 |
| 2013/0222828 A1 | * | 8/2013 | Shimatani | H04N 1/40056 |
| | | | | 358/475 |
| 2019/0116284 A1 | * | 4/2019 | Yoshikaie | H04N 1/12 |

FOREIGN PATENT DOCUMENTS

| | | | | |
|---|---|---|---|---|
| CN | 208386712 U | | 1/2019 | |
| CN | 110138998 | * | 8/2019 | H04N 1/028 |
| CN | 112135005 A | | 12/2020 | |
| DE | 102009025324 | * | 12/2010 | G01B 11/24 |
| JP | S6251858 | * | 3/1987 | H04N 1/04 |
| JP | H0918676 | * | 1/1997 | H04N 1/04 |
| JP | H09130556 | * | 5/1997 | H04N 1/00 |
| JP | 2001024860 | * | 1/2001 | G06T 1/00 |
| JP | 2004037774 | * | 2/2004 | H04N 1/04 |
| JP | 2008236139 | * | 10/2008 | H04N 1/04 |
| JP | 2010233008 | * | 10/2010 | H04N 1/04 |

* cited by examiner

CONTACT IMAGE SENSOR

CROSS-REFERENCE TO RELATED APPLICATIONS

This application is a national phase entry under 35 U.S.C § 371 of International Application No. PCT/CN2021/108711, filed on Jul. 27, 2021, which claims priority to the 202010966228.1, filed on Sep. 15, 2020, the entire content of all of which is incorporated herein by reference.

TECHNICAL FIELD

The present invention belongs to the technical field of image sensors and, in particular, to a contact image sensor.

BACKGROUND

Figure 1:
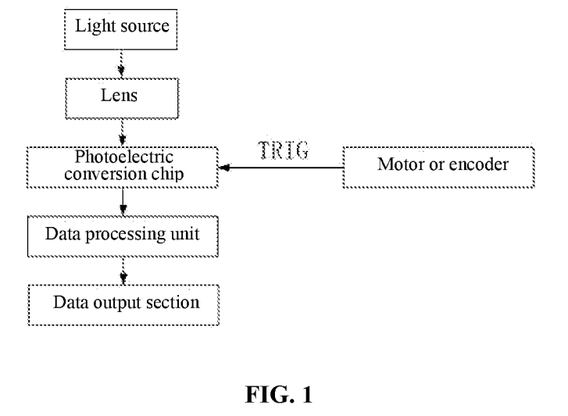
FIG. 1 is a schematic diagram of a contact image sensor in the prior art.

In the prior art, the composition block diagram of existing contact image sensors is shown in FIG. 1, which consists of a light source, a lens, a photoelectric conversion chip, a data processing unit, and a data output section. During the scanning of the image sensor, in order to match the traveling speed of the external object to be detected, the motor or encoder etc. that transmits the object to be detected emits a trigger pulse TRIG, the light from the light source illuminates the original copy, the image, text etc. on the original copy produces reflected or transmitted light, this reflected or transmitted light then passes through the lens and irradiates to the photoelectric conversion chip, the photoelectric conversion chip converts the received light signal into an electrical signal, which is processed by the data processing unit and then output by the data output section.

Figure 2:
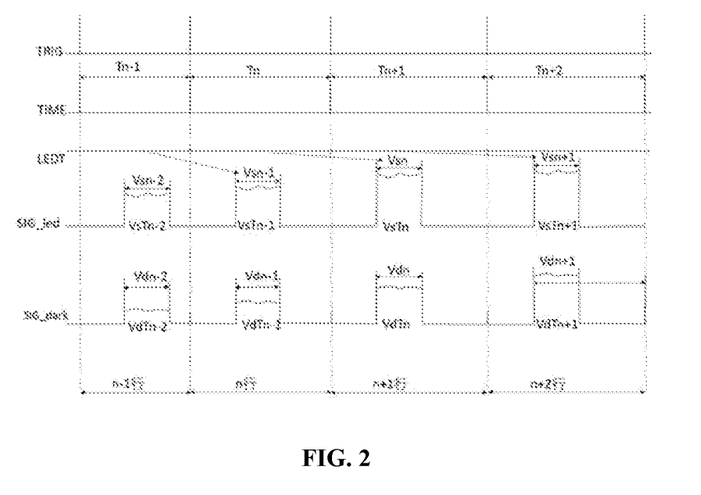
FIG. 2 is an output timing diagram of a contact image sensor in the prior art.

The electrical signal SIG output from the photoelectric conversion chip consists of two parts, i.e. the photosensitive output SIG_led of the photoelectric conversion chip and the dark current output SIG_led of the photoelectric conversion chip, SIG=SIG_led+SIG_dark; as shown in FIG. 2, a time axis TIME which measures the length of time is added; for example, the line period length of line n−1 is $T_n-1$, the line period length of line n is $T_n$, and the line period length of line n+1 is $T_{n+}1$ and the line period length of line n+2 is $T_n+2$, the output of the photoelectric conversion chip is interlaced, i.e. the scan of the previous line is output in the next line.

The photosensitive output of line n−1 of the photosensitive output SIG_led of the photoelectric conversion chip is output in line n, which is $V_{sn}-1$; the photosensitive output of the photoelectric conversion chip in line n is output in line n+1 V, which is $V_{sn}$; the photosensitive output of the photoelectric conversion chip in line n+1 is output in line n+2, which is $V_{sn}+1$; while, the value of $V_{sn}-1$, $V_{sn}$, and $V_{sn}+1$ is primarily related to the illuminating time of the light source, and the light time of each line is the scanning line period of $T_n-1$, $T_n$, and $T_n+1$; the scanning line period of $T_n-1$, $T_n$, and $T_n+1$ changes with the speed of transmitting the object to be detected, so $V_{sn}-1$, $V_{sn}$, and $V_{sn}+1$ are not the same.

The dark current output of line n−1 of the dark current output SIG_dark of the photoelectric conversion chip is output in line n, which is $V_{dn}-1$; the dark current output of the photoelectric conversion chip in line n is output in line n+1, which is $V_{dn}$; the dark current output of the photoelectric conversion chip in line n+1 is output in line n+2, which is $V_{dn}+1$; the size of the dark current is related to the length of the line period, the longer the line period time, the higher the dark current and thus the higher the dark voltage generated; the scanning line period of each line is $T_n-1$, $T_n$, and $T_n+1$ respectively; the scanning line period of $T_n-1$, $T_n$, and $T_n+1$ changes with the speed of transmitting the object to be detected, so $T_n-1$, $T_n$, and $T_n+1$ n are not the same.

From the above, the different and random photosensitive output and dark voltage of each line leads to the inability to calibrate the image sensor, which can seriously affect the sensitivity of the photoelectric conversion chip, the dynamic range and the output variation of each line, affecting the image recognition; in extreme cases, if the speed of transmitting the object to be detected is too slow and the line period is too long, the dark voltage will be excessive, causing the dark voltage to reach the limit value, leaving the photoelectric conversion chip in a saturated state and completely unable to receive the optical signal; therefore there is an urgent need to develop a new contact image sensor.

SUMMARY

The present invention overcomes the shortcomings of the prior art and the technical problem to be solved is to provide a contact image sensor that does not cause changes in sensitivity, dynamic range and line output due to changes in the speed of the object to be detected, affecting image recognition.

The technical scheme adopted by the present invention to solve the above technical problem is as follows: a contact image sensor having a preset scanning plane which is used for the surface to be scanned to map to the original copy. The contact image sensor comprises: a timing circuit: for self-generating light source control signal LRDT and line scan control signal TRIG1, a light source: for illuminating the original copy; a lens: for collecting reflected light emitted by the light source reflected by the original copy and emitting the reflected light onto a photoelectric conversion chip; a photoelectric conversion chip: for converting received optical signals into electrical signals; and a data processing unit: emitting trigger pulse TRIG according to the encoder transmitting the object to be detected, receiving and processing electrical signals output by the photoelectric conversion chip.

Preferably, the data processing unit comprises: a storage: for storing the electrical signals output by the photoelectric conversion chip at each time; an amplifier: for amplifying the electrical signals output by the photoelectric conversion chip; a processing center: for receiving and processing the electrical signals amplified by the amplifier and outputting image information outwards; and a display: for receiving and displaying image information output from the processing.

Preferably, the image sensor matches the traveling speed of the external object to be detected, causing the data processing unit to process and output data according to the trigger pulse TRIG.

Preferably, the image sensor causes the timing circuit to self-generate a line scan control signal for a fixed line period and a light source lighting control signal for a fixed point lighting time from a timing generation circuit.

The preferably, the line scan control signal for a fixed line period self-generated by the timing circuit shall meet the timing requirements of the product to be scanned.

Preferably, the data processing unit emits trigger pulse TRIG according to the encoder transmitting the object to be detected, receives and processes the data transmitted to the data processing unit by the photoelectric conversion chip of the line scan control signal in the line corresponding to the period of each line in the TRIG signal, matching the traveling speed of the external object to be detected.

Preferably, the timing circuit may not control the light source lighting control signal, i.e., the light source is constantly on without adjusting lighting on or off.

Compared with the prior art, the present invention has the following beneficial effects: A contact image sensor of the present invention, comprising: a timing circuit, a light source, a lens, a photoelectric conversion chip and a data processing unit, wherein the light from the light source illuminates the original copy, the image, text etc. on the original copy produces reflected or transmitted light, this reflected or transmitted light then passes through the lens and irradiates to the photoelectric conversion chip, the photoelectric conversion chip converts the received light signal into an electrical signal, which is processed by the data processing unit and then output; during the scanning of the contact image sensor, in order to match the traveling speed of the external object to be detected, the motor or encoder etc. that transmits the object to be detected emits a trigger pulse TRIG, and the electrical signal SIG output by the photoelectric conversion chip of the present invention does not change with the traveling speed of the external object to be detected, the contact image sensor matches both the traveling speed of the external object to be detected and the output of the contact image sensor does not change with the traveling speed of the external object to be detected, while the dark current of the contact image sensor can be controlled within the specification, ensuring the output stability and dynamic range and sensitivity of the image sensor.

BRIEF DESCRIPTION OF THE DRAWINGS

The present invention will be further described below with reference to accompanying drawings.

DETAILED DESCRIPTION

In order to make the purpose, technical scheme and advantages of the embodiments of the present invention clearer, the technical scheme in the embodiments of the present invention will be clearly and completely described below in conjunction with the accompanying drawings in the embodiments of the present invention, it being clear that the embodiments described are part of the embodiments of the present invention and not all of them; based on the embodiments in the present invention, all other embodiments obtained without creative labor by a person of ordinary skill in the art fall within the scope of protection of the present invention.

Figure 3:
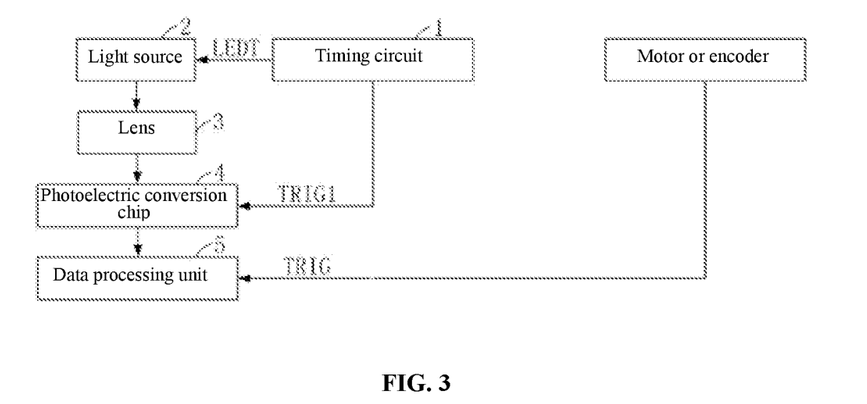
FIG. 3 is a schematic diagram of a contact image sensor of embodiment 1 of the present invention.

FIG. 3 is schematic diagram of a contact image sensor of Embodiment 1 of the present invention, as shown in FIG. 3, a contact image sensor, having a preset scanning plane which is used for the surface to be scanned to map to the original copy. The contact image sensor comprises:

timing circuit 1: for self-generating light source control signal LRDT and line scan control signal TRIG1, light source 2: for illuminating the original copy;

lens 3: for collecting reflected light emitted by the light source reflected by the original copy and emitting the reflected light onto a photoelectric conversion chip;

photoelectric conversion chip 4: for converting received optical signals into electrical signals; and data processing unit 5: emitting trigger pulse TRIG according to the encoder transmitting the object to be detected, receiving and processing electrical signals output by the photoelectric conversion chip.

Further, the image sensor matches the traveling speed of the external object to be detected, without the timing circuit 1 matching the trigger pulse TRIG, causing the data processing unit to process and output data according to the trigger pulse TRIG.

Further, the image sensor causes the timing circuit to self-generate a line scan control signal for a fixed line period and a light source lighting control signal for a fixed point lighting time from a timing generation circuit. Further, the image sensor scan is not synchronized with the trigger pulse TRIG, i.e. the timing circuit 1 does not generate the light source control signal and the photoelectric conversion chip line scan control signal according to the trigger pulse TRIG, but the timing circuit 1 self-generates the line scan control signal TRIG1 for a fixed line period and the light source 2 lighting control signal LEDT for a fixed lighting time.

Further, the line scan control signal for a fixed line period self-generated by the timing circuit 1 shall meet the timing requirements of the product to be scanned.

Further, the data processing unit 5 emits trigger pulse TRIG according to the encoder transmitting the object to be detected, receives and processes the data transmitted to the data processing unit 5 by the photoelectric conversion chip of the line scan control signal in the line self-generated by the timing circuit 1 corresponding to the period of each line in the TRIG signal, matching the traveling speed of the external object to be detected.

Specifically, the light from the light source 2 illuminates the original copy, the image, text etc. on the original copy produces reflected or transmitted light, this reflected or transmitted light then passes through the lens 3 and irradiates to the photoelectric conversion chip 4, the photoelectric conversion chip 4 converts the received light signal into an electrical signal, causing the data to be processed by the data processing unit 4 and then output; during the scanning of the image sensor, in order to match the traveling speed of the external object to be detected, the motor or encoder, etc. transmitting the object to be detected is to emit the trigger pulse TRIG.

Figure 4:
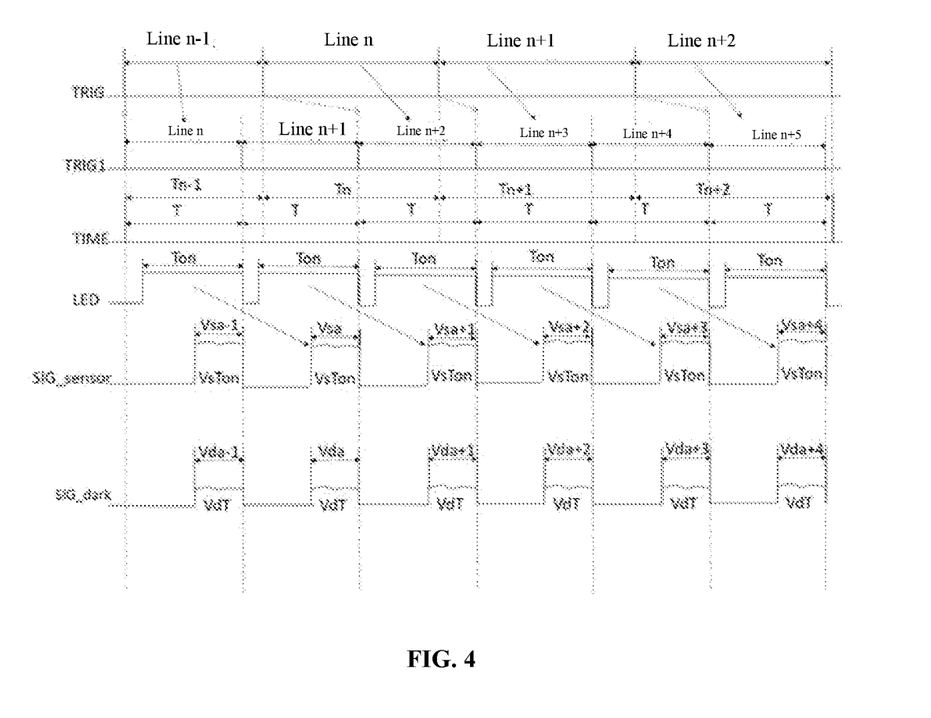
FIG. 4 is an output timing diagram of a contact image sensor of embodiment 1 of the present invention.

FIG. 4 is an output timing diagram of this embodiment, as shown in FIG. 4, each line period of the photoelectric conversion chip 4 line scan control signal TRIG1 has the same length of time; the trigger pulse generates line n−1, line n, line n+1, line n+2, and the timing circuit 1 self-generates the line scan control signal TRIG1, which has line a, line a+1, line a+2 line a+3, line a+4, line a+5, both of which has the equal length of line period, being T, and the timing circuit 1 self-generates the light source control signal LRDT, which controls the light source light time within the line period of the light source in line a, line a+1, line a+2, line a+3, line a+4, line a+5 being $T_{on}$.

The size of the electrical signal SIG output from the photoelectric conversion chip 4 consists mainly of two parts, the photosensitive output SIG_led of the photoelectric conversion chip 4 and the dark current output SIG_dark of the photoelectric conversion chip 4, i.e. SIG=SIG_led+SIG_dark.

Specifically, the photosensitive output SIG_led of the photoelectric conversion chip 4 is as follows: the signal acquired in line a−1 is output in line a as $V_{sa}-1$, the signal acquired in line a is output in line a+1 as $V_{sa}$, the signal acquired in line a+1 is output in line a+2 as $V_{sa}+1$, the signal acquired in line a+2 is output in line a+3 as $V_{sa}+2$, the signal acquired in line a+3 is output in line a+4 as $V_{sa}+3$, the signal acquired in line a+4 is output in line a+5 as $V_{sa}+4$, because all of the light source light time within the period in line a, line a+1, line a+2, line a+3, line a+4 and line a+5 is $T_{on}$, $V_{sa}-1=V_{sa}=V_{sa}+1=V_{sa}+2=V_{sa}+3=V_{sa}+4=V_{sa}+5=V_{sa}T_{on}$.

Specifically, the dark current output SIG_dark of the photoelectric conversion chip 4 is as follows: the dark current in line a−1 is output in line a as $V_{da}-1$, the dark current in line a is output in line a+1 as $V_{da}$, the dark current in line a+1 is output in line a+2 as $V_{da}+1$, the dark current in line a+2 is output in line a+3 as $V_{da}+2$, the dark current in line a+3 is output in line a+4 as $V_{da}+3$, the dark current in line a+4 is output in line a+5 as $V_{da}+4$, because all of the period of time in line a, line a+1, line a+2, line a+3, line a+4, and line a+5 is fixed, $V_{da}-1=V_{da}=V_{da}+1=V_{da}+2=V_{da}+3=V_{da}+4=V_{da}T$, and at the same time, the timing circuit 1 may have a control over the time T of the line period, to make the dark current output SIG_dark of the photoelectric conversion chip 1 within the product specification and controllable, and make the photoelectric conversion chip 4 unsaturated and have excellent sensitivity.

As can be seen above, the size SIG=SIG_led+SIG_dark of the electrical signal output by the photoelectric conversion chip 4 does not change with the traveling speed of the external object to be detected.

The data processing unit 5, according to the external trigger pulse TRIG, processes and outputs the data transmitted to the data processing unit 5 by the photoelectric conversion chip 4 of the line scan control signal in the line self-generated by the timing circuit 1 corresponding to the period of each line in the TRIG signal, matching the traveling speed of the external object to be detected; for example, TRIG is divided into line n−1, line n, line n+1, and line n+2, respectively corresponding to line a, line a+2, line a+3, and line a+5 in TRIG1 self-generated by the timing sequence, while the sizes SIG of the electrical signals output by the photoelectric conversion chip 4 in line a, line a+2, line a+3 and line a+5 are the same, so the contact image sensor in this embodiment matches the traveling speed of the external object to be detected and the output of the contact image sensor does not change with the traveling speed of the external object to be detected. It is also possible to control the dark current of the contact image sensor within specification.

In summary, although the time length of the line period of $T_n-1$, $T_n$, $T_n+1$ and $T_n+2$ is different for line n−1, line n, line n+1 and line n+2 due to variations in the traveling speed of the external object to be detected, the output of the contact image sensor in line n−1, line n, line n+1 and line n+2 is guaranteed to be the same by this embodiment, and the dark current of the contact image sensor can be controlled within the specification, ensuring the output stability and dynamic range and sensitivity of the image sensor.

Figure 5:
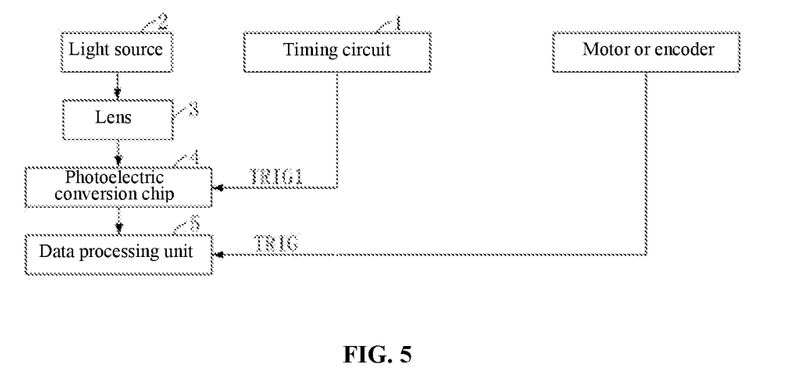
FIG. 5 is a schematic diagram of a contact image sensor of embodiment 2 of the present invention.

FIG. 5 is a schematic diagram of a contact image sensor of Embodiment 2 of the present invention, as shown in FIG. 5, the image sensor matches the traveling speed of the external object to be detected, causing the timing circuit 1 not to match the trigger pulse TRIG, but the data processing unit 5 to process and output data according to the trigger pulse TRIG; the image sensor scan is not synchronized with the trigger pulse TRIG, i.e. the timing circuit 1 does not generate the photoelectric conversion chip 4 line scan control signal according to the trigger pulse TRIG, but the timing circuit 1 self-generates the line scan control signal TRIG1 for a fixed line period and the timing circuit 1 does not generate the light source control signal LEDT, i.e. the light source 2 is constantly on without adjusting lighting on or off.

Figure 6:
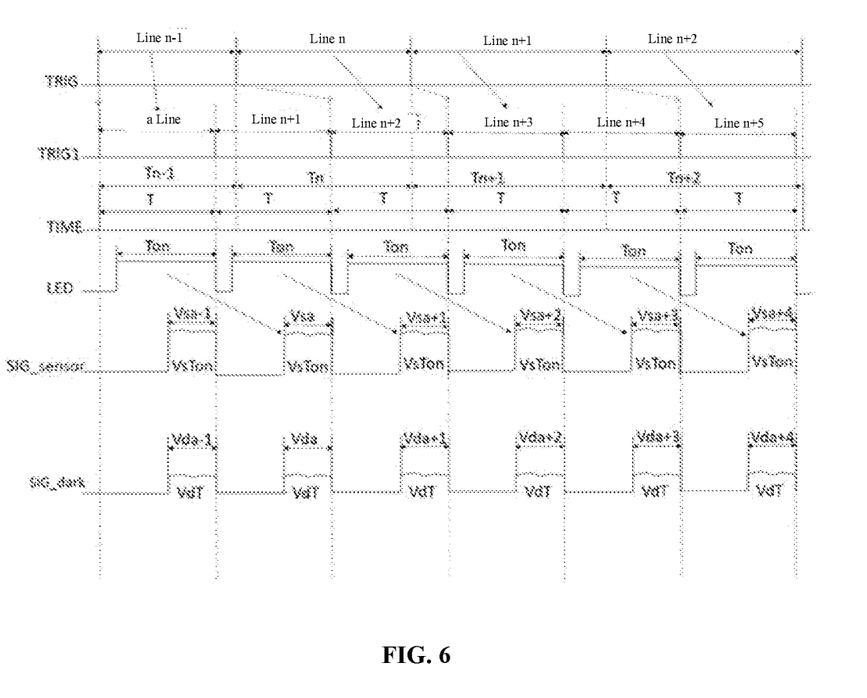
FIG. 6 is an output timing diagram of a contact image sensor of embodiment 2 of the present invention.

FIG. 6 is an output timing diagram of this embodiment, as shown in FIG. 6, each line period of the photoelectric conversion chip 4 line scan control signal TRIG1 has the same length of time; the trigger pulse generates line n−1, line n, line n+1, line n+2, and the timing circuit 1 self-generates the line scan control signal TRIG1, which has line a, line a+1, line a+2, line a+3, line a+4, line a+5, both of which has the equal length of line period, being T, and the size of the electrical signal SIG output from the photoelectric conversion chip 4 consists mainly of two parts, the photosensitive output SIG_led of the photoelectric conversion chip 4 and the dark current output SIG_dark of the photoelectric conversion chip 4, i.e. SIG=SIG_led+SIG_dark.

Specifically, the photosensitive output SIG_led of the photoelectric conversion chip 4 is as follows: the signal acquired in line a−1 is output in line a as $V_{sa}-1$, the signal acquired in line a is output in line a+1 as $V_{sa}$, the signal acquired in line a+1 is output in line a+2 as $V_{sa}+1$, the signal acquired in line a+2 is output in line a+3 as $V_{sa}+2$, the signal acquired in line a+3 is output in line a+4 as $V_{sa}+3$, the signal acquired in line a+4 is output in line a+5 as $V_{sa}+4$, because the light source within the periods of line a, line a+1, line a+2, line a+3, line a+4 and line a+5 are constantly kept on, then the light source lighting time of each line is line period of T, so $V_{sa}-1=V_{sa}=V_{sa}+1=V_{sa}+2=V_{sa}+3=V_{sa}+4=V_{sa}+5=V_sT$.

Specifically, the dark current output SIG_dark of the photoelectric conversion chip 4 is as follows: the dark current in line a−1 is output in line a as $V_{da}-1$, the dark current in line a is output in line a+1 as $V_{da}$, the dark current in line a+1 is output in line a+2 as $V_{da}+1$, the dark current in line a+2 is output in line a+3 as $V_{da}+2$, the dark current in line a+3 is output in line a+4 as $V_{da}+3$, the dark current in line a+4 is output in line a+5 as $V_{da}+4$, because all of the period of time in line a−1, line a, line a+1, line a+2, line a+3, and line a+4 is fixed, $V_{da}-1=V_{da}=V_{da}+1=V_{da}+2=V_{da}+3=V_{da}+4=V_dT$, and at the same time, the timing circuit 1 may have a control over the time T of the line period, to make the dark current output SIG_dark of the photoelectric conversion chip 1 within the product specification and controllable, and make the photoelectric conversion chip 4 unsaturated and have excellent sensitivity.

As can be seen above, the size SIG=SIG_led+SIG_dark of the electrical signal output by the photoelectric conversion chip 4 does not change with the traveling speed of the external object to be detected.

The data processing unit 5, according to the external trigger pulse TRIG, processes and outputs the data transmitted to the data processing unit 5 by the photoelectric conversion chip 4 of the line scan control signal in the line self-generated by the timing circuit 1 corresponding to the period of each line in the TRIG signal, matching the traveling speed of the external object to be detected; for example, TRIG is divided into line n−1, line n, line n+1, and line n+2, respectively corresponding to line a, line a+2, line a+3, and line a+5 in TRIG1 self-generated by the timing sequence, while the sizes SIG of the electrical signals output by the photoelectric conversion chip 4 in line a, line a+2, line a+3 and line a+5 are the same, so the contact image sensor in this embodiment matches the traveling speed of the external object to be detected and the output of the contact image sensor does not change with the traveling speed of the external object to be detected, while the dark current of the contact image sensor can be controlled within the specification.

In summary, although the time length of the line period of $T_n-1$, $T_n$, $T_n+1$ and $T_n+2$ is different for line n−1, line n, line n+1 and line n+2 due to variations in the traveling speed of the external object to be detected, the output of the contact image sensor in line n−1, line n, line n+1 and line n+2 is guaranteed to be the same by this embodiment, and the dark current of the contact image sensor can be controlled within the specification, ensuring the output stability and dynamic range and sensitivity of the image sensor.

Figure 7:
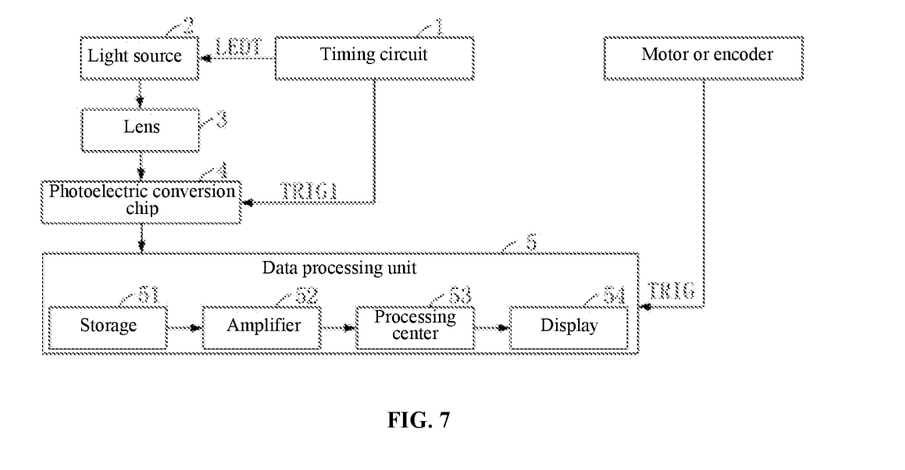
FIG. 7 is a schematic diagram of a contact image sensor of embodiment 3 of the present invention.

FIG. 7 is a schematic diagram of a contact image sensor of embodiment 3 of the present invention, as shown in FIG. 7, on the basis of Embodiment 1, the data processing unit 5 comprises:

storage 51: for storing the electrical signals output by the photoelectric conversion chip at each time;

amplifier 52: for amplifying the electrical signals output by the photoelectric conversion chip;

processing center 53: for receiving and processing the electrical signals amplified by the amplifier and outputting image information outwards; and display 54: for receiving and displaying image information output from the processing.

In the above embodiments, the description of each embodiment has its own focus and the parts not detailed in one embodiment can be found in the relevant descriptions of other embodiments.

It will be appreciated that the relevant features in the above methods, devices and systems can be cross-referenced. Furthermore, the "first", "second" etc. in the above embodiments are used to distinguish between the embodiments and do not represent the superiority or inferiority of each embodiment.

It will be clear to those skilled in the field that, for the sake of convenience and brevity of description, the specific working processes of the systems and modules described above can be referred to the corresponding processes in the previous method embodiments and will not be repeated here.

The algorithms and displays provided here are not inherently associated with any particular computer, virtual system or other device. A variety of universal systems can also be used in conjunction with the teach-in based here. The structure required to construct such a device is obvious from the above description. Furthermore, the present invention is not specific to any particular programming language. It should be understood that a variety of programming languages can be utilized to implement the elements of the present invention described herein and that the above description of particular languages is provided to disclose the best embodiments of the present invention.

In the embodiments provided in this application, it should be understood that the systems and methods disclosed, can be implemented in other ways. The system embodiments described above are merely schematic, for example, the division of the modules described, which is only a logical functional division, can be done in another way for practical implementation, and also, for example, multiple modules or components can be combined or can be integrated into another system, or some features can be ignored, or not implemented. On another point, the mutual coupling or direct coupling or communication connection shown or discussed may be an indirect coupling or communication connection via some communication interface, device or unit, which may be electrical, mechanical or otherwise.

The modules illustrated as separate components may or may not be physically separate, and the components displayed as modules may or may not be physical units, i.e., they may be located in one place or may also be distributed over a plurality of network units. Some or all of these units can be selected according to practical needs to achieve the purpose of this embodiment scheme.

Finally, it should be noted that: The foregoing embodiments are intended only to illustrate the technical schemes of the present invention and not to limit them; notwithstanding the detailed description of the present invention with reference to the foregoing embodiments, it should be understood by a person of ordinary skill in the art that it is still possible to modify the technical schemes described in the preceding embodiments or to replace some or all of the technical features thereof with equivalent ones, and that these modifications or replacements do not take the essence of the corresponding technical schemes out of the scope of the technical schemes of the various embodiments of the present invention.

What is claimed is:

1. A contact image sensor having a preset scanning plane for a surface to be scanned to map to an external object to be detected, comprising:
    a timing circuit: for self-generating a light source control signal LRDT and a line scan control signal TRIG1;
    a light source: for illuminating the external object to be detected;
    a lens: for collecting reflected light emitted by the light source reflected by the external object to be detected and emitting the reflected light onto a photoelectric conversion chip;
    the photoelectric conversion chip: for converting received optical signals into electrical signals; and
    a data processing unit: receiving and processing the electrical signals output by the photoelectric conversion chip according to a trigger pulse TRIG sent by an electric motor moving the external object to be detected;
    wherein:
        the line scan control signal TRIG1 is a pulse signal with a constant repetition cycle;
        the trigger pulse TRIG is a pulse signal with a variable repetition cycle; and
        the line scan control signal TRIG1 repeats faster than the trigger pulse TRIG, such that the electrical signal generated within a repetition cycle of the trigger pulse TRIG is processed within a repetition cycle of the line scan control signal TRIG1 that immediately follows a leading edge of the repetition cycle of the trigger pulse TRIG.

2. The contact image sensor according to claim 1, wherein: the data processing unit comprises:
    a storage: for storing the electrical signals output by the photoelectric conversion chip at each time;
    an amplifier: for amplifying the electrical signals output by the photoelectric conversion chip;
    a processing center: for receiving and processing the electrical signals amplified by the amplifier and outputting image information outwards; and a display: for receiving and displaying the image information output from the processing center.

3. The contact image sensor according to claim 1, wherein: the image sensor matches a traveling speed of the external object to be detected, causing the data processing unit to process and output data according to the trigger pulse TRIG.

4. The contact image sensor according to claim 1, wherein: the image sensor causes the timing circuit to self-generate the line scan control signal TRIG1 for a fixed line period and the light source control signal LRDT for a fixed point lighting time from the timing circuit.

5. The contact image sensor according to claim 1, wherein: the line scan control signal TRIG1 for the fixed line period self-generated by the timing circuit meets timing requirements of the external object to be detected.

6. The contact image sensor according to claim 1, wherein: the data processing unit receives and processes the electrical signals transmitted to the data processing unit by the photoelectric conversion chip based on the line scan control signal TRIG1 in the line self-generated by the timing circuit corresponding to the period of each line in the TRIG signal, matching the traveling speed of the external object to be detected.

7. The contact image sensor according to claim 1, wherein: the timing circuit does not control the light source control signal LRDT, and the light source is constantly on without adjusting lighting on or off.

\* \* \* \* \*